United States Patent
Sugiyama et al.

(10) Patent No.: US 7,689,095 B2
(45) Date of Patent: Mar. 30, 2010

(54) ELECTRONIC DEVICE SYSTEM

(75) Inventors: Nobukazu Sugiyama, Tokyo (JP); Makoto Korehisa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1974 days.

(21) Appl. No.: 09/756,318

(22) Filed: Jan. 8, 2001

(65) Prior Publication Data

US 2001/0021305 A1  Sep. 13, 2001

(30) Foreign Application Priority Data

Jan. 11, 2000 (JP) .............................. 2000-002822
Mar. 24, 2000 (JP) .............................. 2000-084166

(51) Int. Cl.
*H04N 5/91* (2006.01)
*H04N 5/44* (2006.01)

(52) U.S. Cl. ............................ 386/46; 386/83; 348/734

(58) Field of Classification Search .................. 386/83, 386/46; 715/501.1; 725/37, 38, 46, 151, 725/10–12; 348/734
See application file for complete search history.

(56) References Cited

U.S. PATENT DOCUMENTS

| | | | | |
|---|---|---|---|---|
| 5,945,988 | A * | 8/1999 | Williams et al. | 725/46 |
| 6,366,731 | B1 * | 4/2002 | Na et al. | 386/46 |
| 6,667,992 | B1 * | 12/2003 | Yanagawa | 709/203 |
| 6,725,281 | B1 * | 4/2004 | Zintel et al. | 719/318 |
| 6,844,886 | B1 * | 1/2005 | Yanagawa et al. | 715/744 |
| 2005/0022110 | A1 * | 1/2005 | Humpleman et al. | 715/501.1 |
| 2005/0044577 | A1 * | 2/2005 | Jerding et al. | 725/37 |

FOREIGN PATENT DOCUMENTS

| | | | |
|---|---|---|---|
| JP | 4 282999 | | 10/1992 |
| JP | 5 260554 | | 10/1993 |
| JP | 6 205463 | | 7/1994 |
| JP | 9 282031 | | 10/1997 |
| JP | 10-164449 | * | 6/1998 |
| JP | 10 178686 | | 6/1998 |
| JP | 10 234088 | | 9/1998 |
| JP | 11 16272 | | 1/1999 |
| JP | 2000 196654 | | 7/2000 |
| JP | 2001 145179 | | 5/2001 |

* cited by examiner

*Primary Examiner*—Vincent Boccio
(74) *Attorney, Agent, or Firm*—Frommer Lawrence & Haug LLP; William S. Frommer; Paul A. Levy

(57) ABSTRACT

An electronic device system includes a plurality of electronic devices each having at least an audiovisual playback device capable of reading one of stored audiovisual content data and received audiovisual content data, and an audiovisual output device capable of outputting desired audiovisual content, a bus establishing connection among the plurality of electronic devices, and a controller capable of controlling the electronic devices connected to the bus. In the electronic device, the audiovisual output device connected via the bus includes a device identifying unit for identifying, under the control of the controller, the audiovisual output device which outputs the desired audiovisual content, and a content output unit for outputting the desired audiovisual content when the audiovisual output device is identified by the device identifying unit.

15 Claims, 3 Drawing Sheets

ELECTRONIC DEVICE SYSTEM

BACKGROUND OF THE INVENTION

1. Field of the Invention

The present invention relates to electronic device systems and more particularly relates to an electronic device system that enables desired audiovisual content to be automatically watched by specifying a predetermined audiovisual output device among a plurality of electronic devices connected to a digital bus.

2. Description of the Related Art

In conventional electronic devices, when a TV (Television set), a VCR (Video Cassette Recorder), and the like are, for example, in the same room, they are connected with each other using cables, allowing the content in the VCR to be output on the TV. When a plurality of electronic devices is connected using, for example, a digital data bus which is a bus according to the IEEE-1394 (Institute of Electrical and Electronic Engineers) standard and which is also known as an "i.Link cable", it is not necessary for these electronic devices to remain in the same room. The digital bus allows electronic devices to be easily connected to the other electronic devices in other rooms and to be remotely controlled from a different room.

When the conventional electronic devices are connected using the i.Link cables as described above, the following problems arise. For example, when a TV set is provided in each room and a user desires, by a remote control unit, to play back data stored in an audiovisual device in a different room, the user must perform a selection operation so that the output from the remote audiovisual device is shown on the TV set near the user. When a plurality of electronic devices is connected, the selection operation becomes complicated.

SUMMARY OF THE INVENTION

Accordingly, it is an object of the present invention to provide an electronic device system, in which a plurality of electronic devices is connected with each other via a data bus, for enabling selected audiovisual information to be automatically output when a user selects desired audiovisual information from among a plurality of electronic devices which is accessible by the user.

To this end, according to a first aspect of the present invention, there is provided an electronic device system including a plurality of electronic devices each having at least an audiovisual playback device capable of reading one of stored audiovisual content data and received audiovisual content data, and an audiovisual output device capable of outputting desired audiovisual content, a bus establishing connection among the plurality of electronic devices, and a controller capable of controlling the electronic devices connected to the bus. In the electronic device system, the audiovisual output device connected via the bus includes a device identifying unit for identifying, under the control of the controller, the audiovisual output device which outputs the desired audiovisual content, and a content output unit for outputting the desired audiovisual content when the audiovisual output device is identified by the device identifying unit.

According to a second aspect of the present invention, an electronic device system includes a plurality of electronic devices each including at least an audiovisual playback device capable of reading one of stored audiovisual content data and received audiovisual content data, and an audiovisual output device capable of outputting desired audiovisual content, a bus for establishing connection among the plurality of electronic devices, and a controller capable of controlling the audiovisual playback device connected to the bus. In the electronic device system, the audiovisual output device connected via the bus includes a voice recognizing unit for recognizing a voice, and a content output unit for outputting the audiovisual content from the audiovisual playback device from which reading is requested by the controller when the voice recognizing unit recognizes a specific voice.

According to a third aspect of the present invention, an electronic device system includes a plurality of electronic devices each including at least an audiovisual playback device capable of reading one of stored audiovisual content data and received audiovisual content data, and an audiovisual output device capable of outputting desired audiovisual content, a bus for establishing connection among the plurality of electronic devices, and a controller capable of controlling the audiovisual playback device connected to the bus. In the electronic device system, the audiovisual output device connected via the bus includes a vibration recognizing unit for recognizing a vibration, and a content output unit for outputting the audiovisual content from the audiovisual playback device from which reading is requested by the controller when the vibration recognizing unit recognizes a specific vibration.

By recognizing the location of the user, specific voices, or vibration, the electronic device proximate to the user is driven and a desired content is shown thereon. Accordingly, by performing only a playback operation or an output operation on the electronic devices connected using the bus, the user can automatically watch the desired content in a desired place.

Further objects, features and advantages of the present invention will become apparent from the following description of the preferred embodiments with reference to the attached drawings.

DESCRIPTION OF THE PREFERRED EMBODIMENTS

An electronic device system according to a first embodiment is described with reference to FIG. 1.

Figure 1:
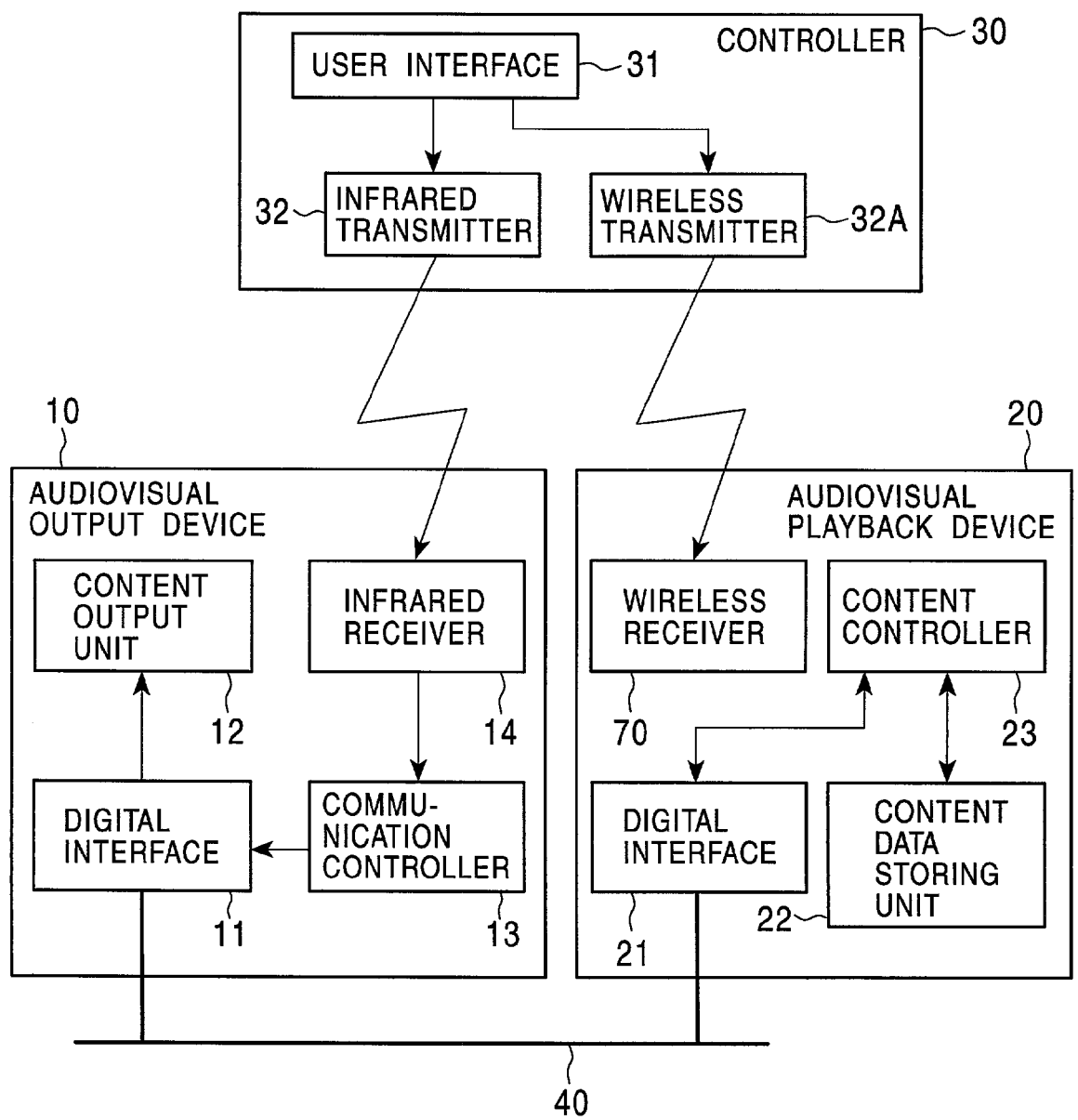
FIG. 1 is a block diagram illustrating the relationship between electronic devices and a controller connected using a digital bus according to a first embodiment.

FIG. 1 shows the construction of the electronic device system according to the first embodiment. The electronic device system includes an audiovisual output device 10 for playing back audiovisual content and performing infrared communication, an audiovisual playback device 20 for reading stored or received audiovisual content data, and a controller 30 for controlling the audiovisual playback device 20, the controller 30 including a remote control unit, a portable phone, and an information unit. The audiovisual output device 10 and the audiovisual playback device 20 are connected via a digital bus 40 provided with a digital interface according to the IEEE-1394 standard.

The audiovisual output device 10 includes a digital interface 11 connected to the digital bus 40, a content output unit 12 for outputting the audiovisual content data, including audiovisual information, obtained via the digital interface 11, a communication controller 13 for controlling data communication with the digital bus 40 connected to the digital interface 11, and an infrared receiver 14 for receiving an infrared control signal from the controller 30 and for sending the control signal to the communication controller 13.

The audiovisual playback device 20 includes a digital interface 21 connected to the digital bus 40, a content data storing unit 22 for storing the audiovisual content data including audiovisual information, a content controller 23 for obtaining the audiovisual content data from the digital bus 40 by controlling the digital interface 21, and a wireless receiver 70 for receiving the control signal from the controller 30.

The controller 30 includes a user interface 31 for interface control for a playback operation and the like, a wireless transmitter 32A for generating a predetermined wireless control signal based on the control signal generated at the user interface 31, and an infrared transmitter 32 for generating an infrared control signal. The control signal contains a signal for selecting content from among audiovisual content data stored in the audiovisual playback device 20.

In the electronic device system, the user plays back desired audiovisual data stored in the audiovisual playback device 20 by using the controller 30. The user interface 31 sends this operation signal to both the wireless transmitter 32A and the infrared transmitter 32. The wireless transmitter 32A wirelessly transmits a control signal 1 and the infrared transmitter 32 transmits by infrared light a control signal 2. The wireless receiver 70 of the audiovisual playback device 20 and the infrared receiver 14 of the audiovisual output device 10 receive these transmitted control signals. Upon detection of the received control signal 2, the communication controller 13 causes the digital interface 11 to establish connection with the digital interface 21 of the audiovisual playback device 20 which the user desires to access so as to be ready for an output signal from the audiovisual playback device 20. The content controller 23 of the audiovisual playback device 20 reads audiovisual content data in accordance with the control signal 1 transmitted from the controller 30 via the wireless receiver 70 and sends the read data via the digital interface 21 to the audiovisual output device 10 using the digital bus 40. Once again, the digital interface 11 of the audiovisual output device 10 receives the transmitted audiovisual content data and outputs the received data to the content output unit 12. In the content output unit 12, when a plurality of audiovisual output devices 10 identifies itself, the desired audiovisual content data is controlled so as to be output to the one identifying itself first among the plurality of audiovisual output devices identifying itself.

Thus, the desired audiovisual content data which is stored in the electronic device (the audiovisual playback device 20 in the present embodiment) is automatically output to another electronic device (the audiovisual output device 10 in the present embodiment), so that the user can watch it on the other electronic device. For example, when electronic devices which are connected with each other via the digital bus 40 are provided in a plurality of rooms, the user can, simply by operating the remote control unit, watch desired audiovisual content which is stored in a different room.

An electronic device system according to a second embodiment is described with reference to FIG. 2.

Figure 2:
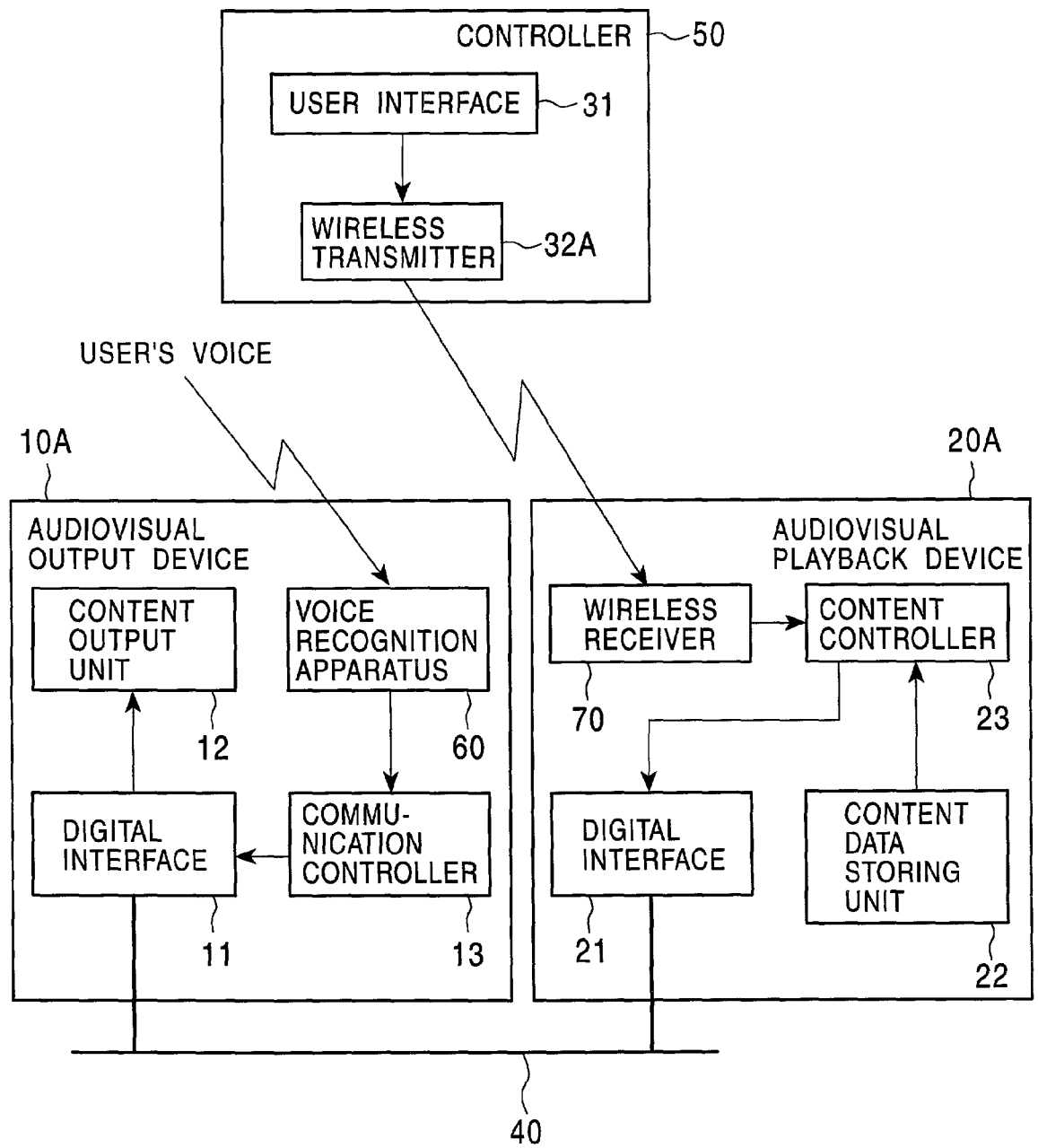
FIG. 2 is a block diagram illustrating the relationship between the electronic devices and the controller connected using the digital bus according to a second embodiment.

As shown in FIG. 2, the electronic device system includes an audiovisual output device 10A for outputting audiovisual content and for recognizing a voice, an audiovisual playback device 20A for storing audiovisual content data therein and for reading the audiovisual content data in accordance with a control signal from a controller 50, and the controller 50 for controlling the audiovisual playback device 20A, the controller 50 including the remote control unit, the portable phone, and the information unit. The audiovisual output device 10A and the audiovisual playback device 20A are connected via the digital bus 40 which is provided with the digital interface according to the IEEE-1394 standard. This digital bus 40 is constructed so as to be connectable to other electronic devices.

The audiovisual output device 10A includes the digital interface 11 connected to the digital bus 40, the content output unit 12 for outputting audiovisual content data, including audiovisual information, obtained via the digital interface 11, the communication controller 13 for controlling data communication with the digital bus 40 connected to the digital interface 11, and a voice recognition apparatus 60 for recognizing the voice.

The audiovisual playback device 20A includes the digital interface 21 connected to the digital bus 40, the content data storing unit 22 for storing the audiovisual content data including the audiovisual content information, the content controller 23 for sending or receiving the audiovisual content data and audiovisual content information to or from the digital bus 40 by controlling the digital interface 21, and the wireless receiver 70 for receiving the control signal from the controller 50.

The controller 50 includes the user interface 31 for interface control for a playback operation and the like, and the wireless transmitter 32A for generating a predetermined wireless control signal based on a control signal generated at the user interface 31.

In the electronic device system having such a construction, the user plays back desired audiovisual content data by uttering a voice such as "PLAYBACK". The voice recognition apparatus 60 of the audiovisual output device 10A recognizes this specific voice. This leads to establish connection via the digital interface 11 between the audiovisual output device 10A and the audiovisual playback device 20A, so that the audiovisual output device 10A is ready for the output from the audiovisual playback device 20A. Along with uttering the voice, the user sends a playback control signal to the audiovisual playback device 20A via the wireless transmitter 32A of the controller 50. Either utterance of the voice or transmission of the control signal may come first, which is determined by the user in accordance with a user's environment. The wireless receiver 70 of the audiovisual playback device 20A receives this control signal. The content controller 23 reads audiovisual content data in accordance with the received control signal and sends the read content data via the digital bus 40 to the audiovisual output device 10A using the digital interface 21. Once again, the digital interface 11 of the audiovisual output device 10A receives the read audiovisual content data. The communication controller 13 outputs the received data to the content output unit 12. When a plurality of audiovisual output devices is specified, the desired audiovisual content data is controlled via the digital bus 40 so as to be output to the audiovisual output device 10A which first recognizes the voice.

Thus, when the electronic device is within the wireless zone coverage, by uttering the voice and wirelessly selecting desired audiovisual content, since the desired audiovisual content data is obtained form the electronic device which stores the audiovisual content data, the desired audiovisual content can be automatically shown on another electric device which is located in a different location.

An electronic device system according to a third embodiment is described with reference to FIG. 3.

Figure 3:
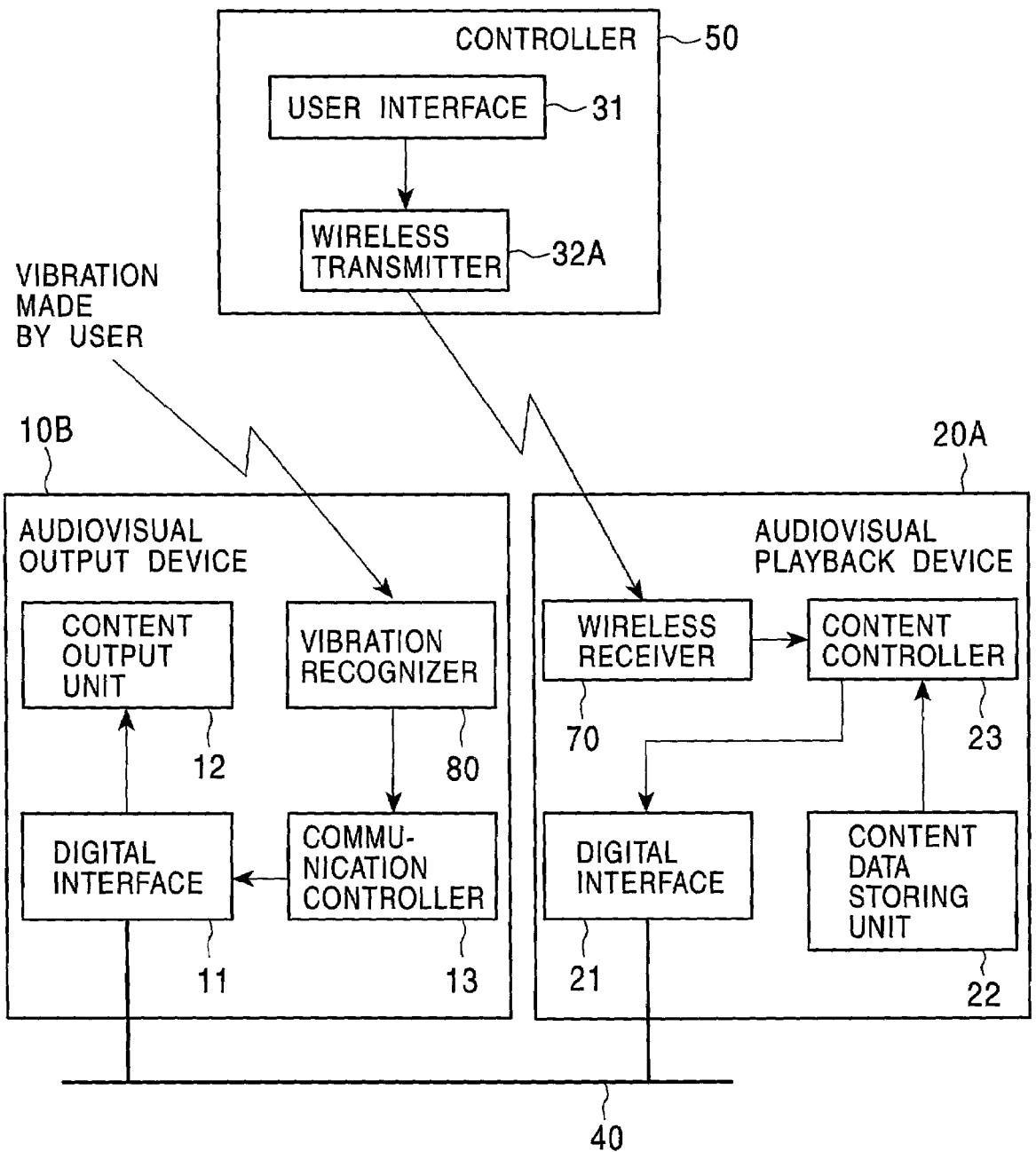
FIG. 3 is a block diagram illustrating the relationship between the electronic devices and the controller connected using the digital bus according to a third embodiment.

As shown in FIG. 3, the electronic device system according to the third embodiment includes an audiovisual output device 10B for outputting audiovisual content and recognizing vibration, the audiovisual playback device 20A for storing the audiovisual content data and reading the audiovisual content data in accordance with the control signal from the controller 50, and the controller 50 for wirelessly controlling the audiovisual playback device 20A. The audiovisual output device 10B and the audiovisual playback device 20A are connected via the digital bus 40 which is provided with the digital interface according to the IEEE-1394 standard. This digital bus 40 is constructed so as to be connectable to other electronic devices.

The audiovisual output device 10B includes the digital interface 11 connected to the digital bus 40, the content output unit 12 for outputting the audiovisual content data, including audiovisual information, obtained via the digital interface 11, the communication controller 13 for controlling data communication with the digital bus 40 connected to the digital interface 11, and a vibration recognizer 80 for recognizing the vibration.

The audiovisual playback device 20A includes the digital interface 21 connected to the digital bus 40, the content data storing unit 22 for storing the audiovisual content data having the audiovisual content information, the content controller 23 for obtaining the audiovisual content data and audiovisual content information from the digital bus 40 by controlling the digital interface 21, and the wireless receiver 70 for receiving the control signal from the controller 50.

The controller 50 includes the user interface 31 for controlling interface for a playback operation and the like, and the wireless transmitter 32A for generating a predetermined wireless control signal based on a control signal generated at the user interface 31.

In the electronic device system which can realize recognition of the vibration by having the above-described construction, the user plays back desired audiovisual content data by making some form of vibration. The vibration recognizer 80 of the audiovisual output device 10B recognizes the vibration. This leads to establish connection via the digital interface 11 between the audiovisual output device 10B and the audiovisual playback device 20A, so that the audiovisual output device 10B is ready for the output from the audiovisual playback device 20A. Along with making the vibration, the user sends a playback control signal to the audiovisual playback device 20A via the wireless transmitter 32A of the controller 50. When the wireless receiver 70 of the audiovisual playback device 20A receives this control signal including a signal for selecting the audiovisual content data stored in the content data storing unit 22, the content controller 23 reads the audiovisual content data in accordance with the control signal and sends the read content data to the audiovisual output device 10B using the digital interface 21. Once again, the digital interface 11 of the audiovisual output device 10B receives the read audiovisual content data. The communication controller 13 outputs the received data to the content output unit 12. When a plurality of audiovisual output devices is specified, the desired audiovisual content data is controlled via the digital bus 40 so as to be output to the audiovisual output device 10B which first recognizes the vibration.

Thus, when the electronic device is within the wireless zone coverage, by making the vibration and wirelessly selecting the desired audiovisual content, since the desired audiovisual content data is obtained form the electronic device which stores the audiovisual content data, the desired audiovisual content can be automatically shown on another electric device which is located in a different location.

The method using the remote control unit for selecting the audiovisual content output device and the audiovisual content playback device, and the method using the voice or the vibration for selecting the audiovisual content output device are not limited to the above-described embodiments. For example, combination of these may be used. In order to specify the audiovisual content output device, a pyroelectric sensor may be used. Alternatively, a contact sensor or a temperature sensor may be used.

What is claimed is:

1. An electronic device system comprising:
   a plurality of audiovisual playback devices;
   a plurality of audiovisual output devices capable of outputting desired audiovisual content and having an output device identifying means, each audiovisual output device including a respective user recognition apparatus;
   a bus establishing a physical connection among said playback devices and output devices; and
   a controller capable of controlling the playback devices and the output devices physically connected to said bus, the controller controlling the output devices according to the respective output device identifying means,
   wherein the controller includes an infrared transmitter and a wireless transmitter,
   wherein the controller provides two signals, the wireless transmitter provides a first signal enabling a user to select audiovisual content from any one of the playback devices and the infrared transmitter provides a second signal to cause identification of a selected one of the output devices to establish communication with the selected playback device,
   wherein when a plurality of output devices are identified to establish communication with the selected audiovisual playback device at the same time, the audiovisual content is controlled to be output to the output device identified first among the plurality of identified playback devices.

2. An electronic device system according to claim 1, wherein said audiovisual output device which outputs said desired audiovisual content is one having the device identifying means which first identifies the audiovisual output device among the plurality of the audiovisual output devices identified by the device identifying means thereof.

3. An electronic device system according to claim 1, wherein said device identifying means identifies the audiovisual output device in accordance with infrared communication means capable of wirelessly communicating a control signal.

4. An electronic device system according to claim 3, wherein said control signal includes a selection signal for selecting from among the audiovisual content data stored in said audiovisual playback device.

5. An electronic device system according to claim 1, wherein said controller that remotely controls the plurality of audiovisual playback devices and the plurality of audiovisual output devices connected to said bus comprises one of a remote control unit, a portable phone, and an information device.

6. An electronic device system according to claim 1, wherein said bus comprises a digital bus according to the IEEE-1394 standard.

7. The electronic device system of claim 1, wherein the controller provides a content selection signal for selecting a desired audiovisual content from audiovisual content among audiovisual content data stored in the audiovisual playback device.

8. An electronic device system comprising:
a plurality of audiovisual playback devices;
a plurality of audiovisual output devices capable of outputting desired audiovisual content and having an output device identifying means;
a bus for establishing a physical connection among said playback devices and output devices; and
a controller including a wireless transmitter and capable of controlling said audiovisual playback devices connected to said bus, wherein said audiovisual output device connected via said bus comprises:
   voice recognizing means for recognizing a voice; and
   content output means for outputting the audiovisual content from said audiovisual playback device from which reading is requested by said controller when said voice recognizing means recognizes a specific voice,
wherein the controller provides two signals, the wireless transmitter provides a first signal enabling a user to select audiovisual content from any one of the playback devices and the voice recognizing means provides a second signal to cause identification of a selected one of the output devices to establish communication with the selected playback device,
wherein when a plurality of output devices are identified to establish communication with the selected audiovisual playback device at the same time, the audiovisual content is controlled to be output to the output device identified first among the plurality of identified playback devices.

9. An electronic device system according to claim 8, wherein said audiovisual output device which outputs said desired audiovisual content is one having the voice recognizing means which first recognizes the voice among the plurality of the audiovisual output devices recognized by the voice recognizing means thereof.

10. An electronic device system according to claim 8, wherein said controller that remotely controls the plurality of audiovisual playback devices and the plurality of audiovisual output devices connected to said bus comprises one of a remote control unit, a portable phone, and an information device.

11. An electronic device system according to claim 8, wherein said bus comprises a digital bus according to the IEEE-1394 standard.

12. An electronic device system comprising:
a plurality of audiovisual playback devices;
a plurality of audiovisual output devices capable of outputting desired audiovisual content and having an output device identifying means;
a bus for establishing a physical connection among said playback devices and output devices; and
a controller including an wireless transmitter and capable of controlling said audiovisual playback devices connected to said bus, wherein said audiovisual output device connected via said bus comprises:
   vibration recognizing means for recognizing a vibration; and
   content output means for outputting the audiovisual content from said audiovisual playback device from which reading is requested by said controller when said vibration recognizing means recognizes a specific vibration,
wherein the controller provides two signals, the wireless transmitter provides a first signal enabling a user to select audiovisual content from any one of the playback devices and the vibration recognizing means provides a second signal to cause identification of a selected one of the output devices to establish communication with the selected playback device,
wherein when a plurality of output devices are identified to establish communication with the selected audiovisual playback device at the same time, the audiovisual content is controlled to be output to the output device identified first among the plurality of identified playback devices.

13. An electronic device system according to claim 12, wherein said audiovisual output device which outputs said desired audiovisual content is one having the vibration recognizing means which first recognizes the vibration among the plurality of the audiovisual output devices recognized by the vibration recognizing means thereof.

14. An electronic device system according to claim 12, wherein said controller that remotely controls the plurality of audiovisual playback devices and the plurality audiovisual output devices connected to said bus comprises one of a remote control unit, a portable phone, and an information device.

15. An electronic device system according to claim 12, wherein said bus comprises a digital bus according to the IEEE-1394 standard.

* * * * *